April 9, 1957

J. R. MacKAY 2,788,477

MOTOR CONTROL FOR CAM FOLLOWER

Filed Sept. 14, 1953

INVENTOR.
JOHN R. MACKAY
BY
Robert A. Dunham
ATTORNEY

April 9, 1957  J. R. MacKAY  2,788,477
MOTOR CONTROL FOR CAM FOLLOWER
Filed Sept. 14, 1953  8 Sheets-Sheet 3
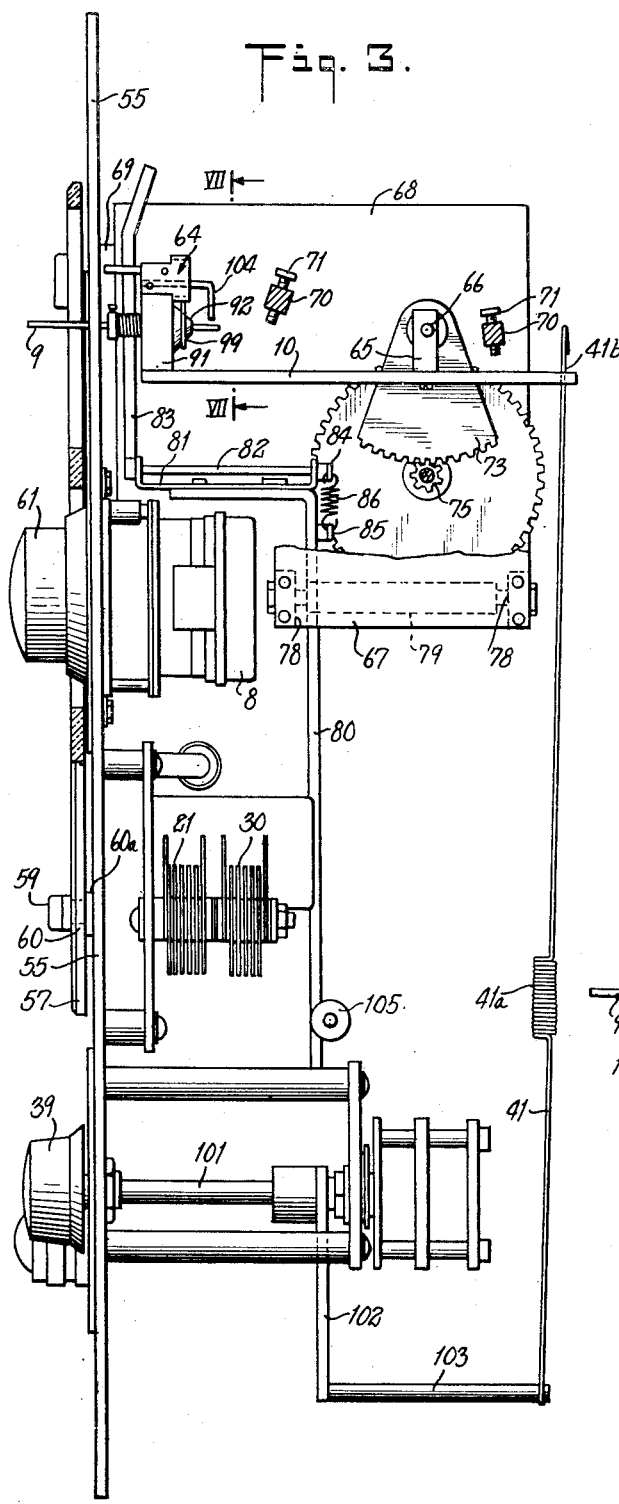
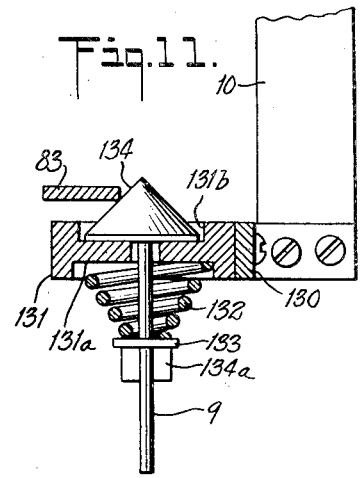
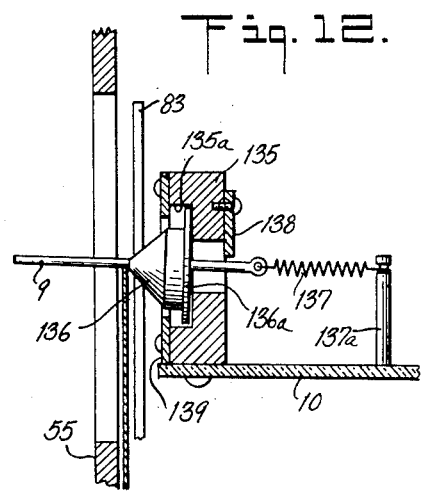
INVENTOR.
JOHN R. MACKAY
BY
Robert S. Dunham
ATTORNEY

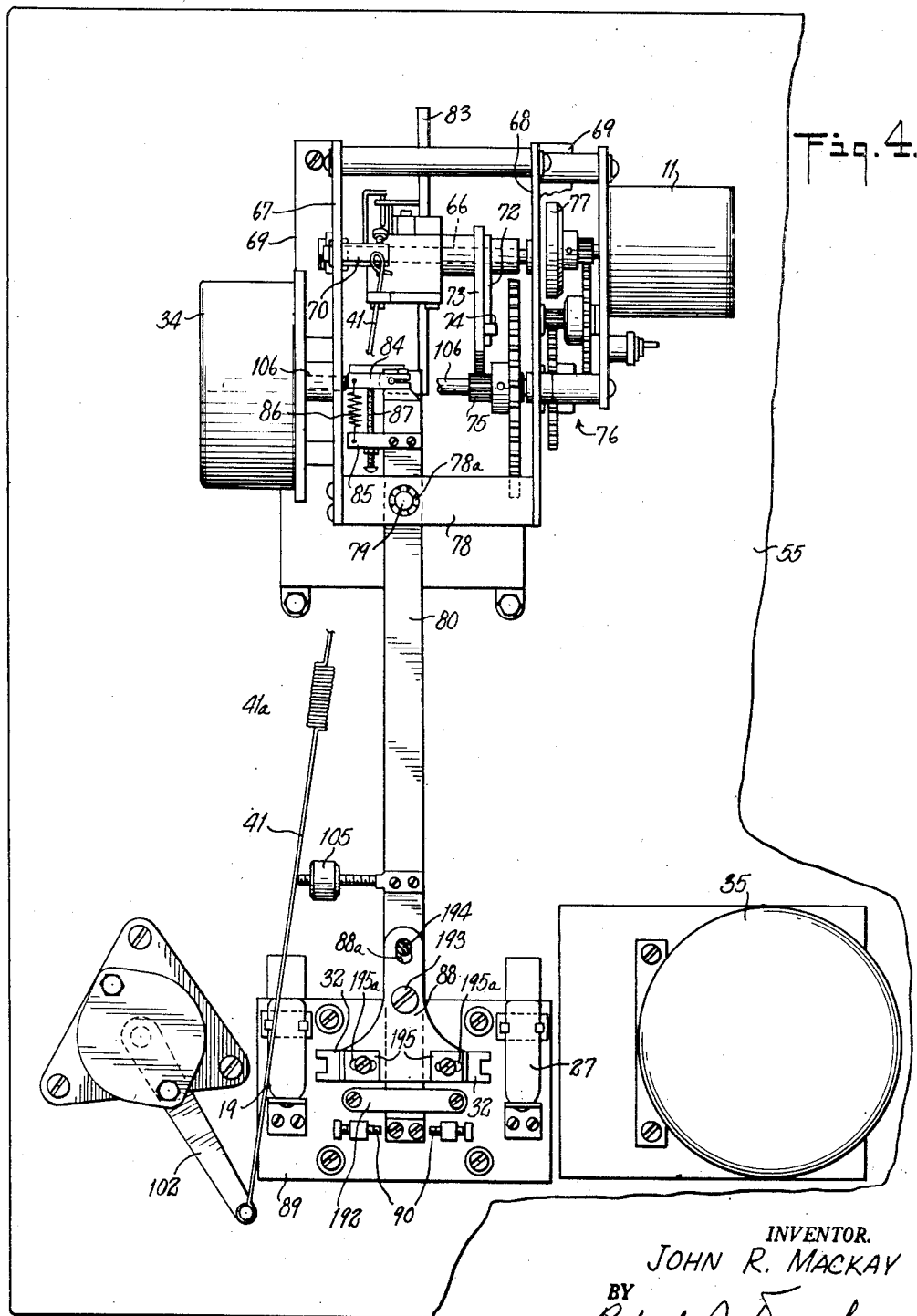

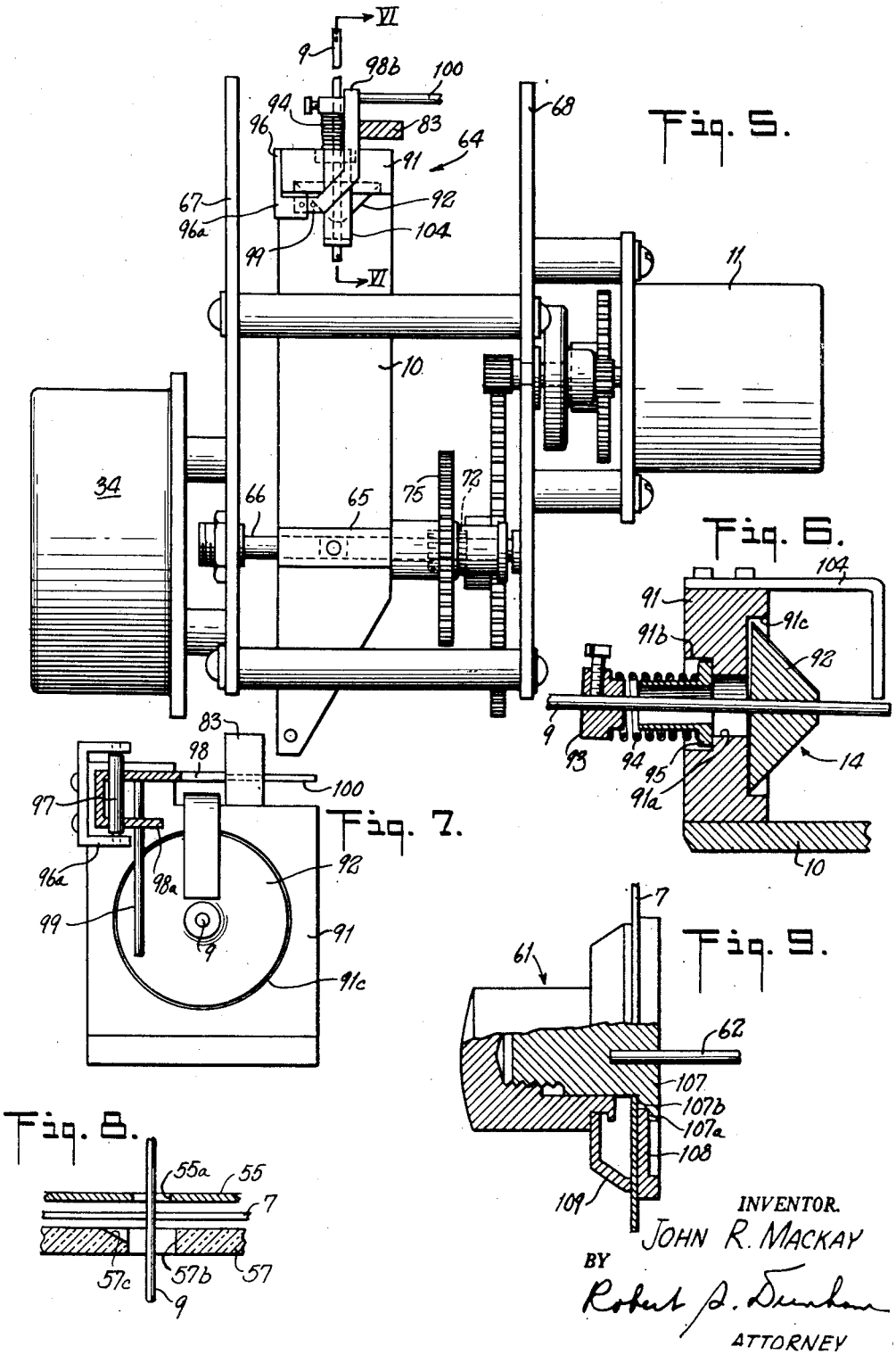

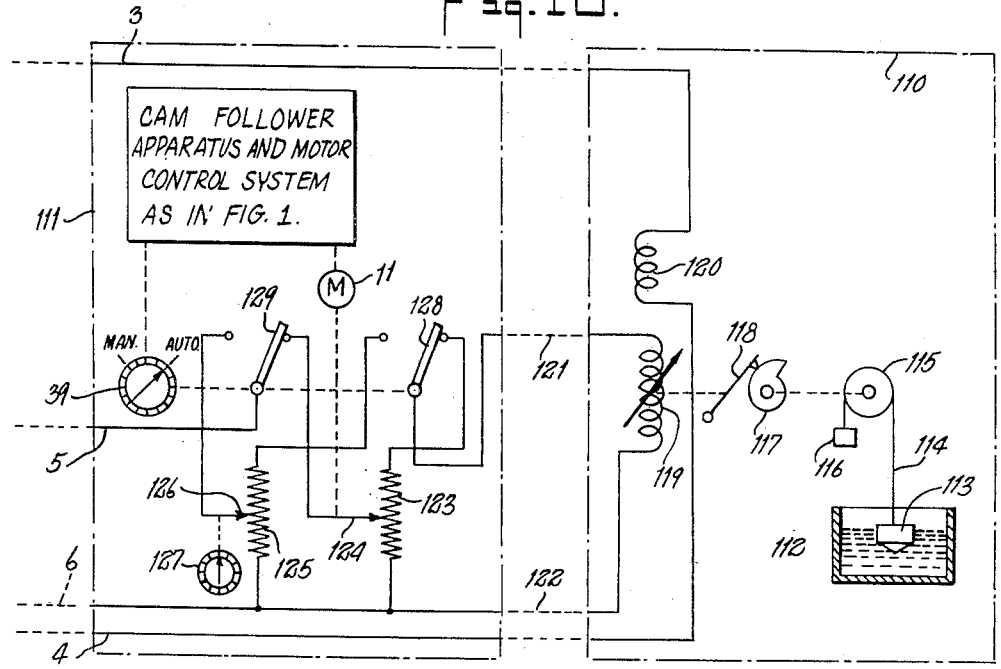
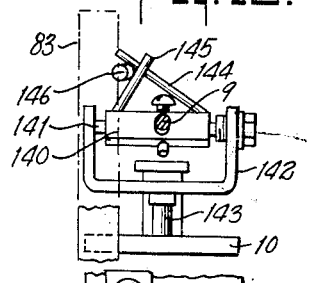
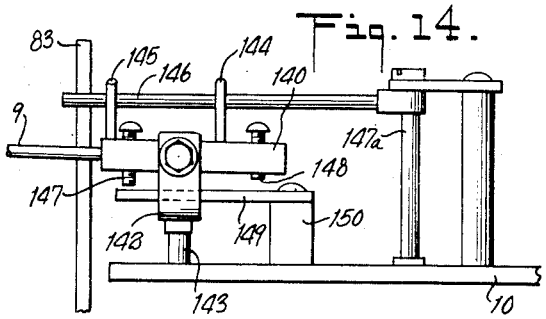
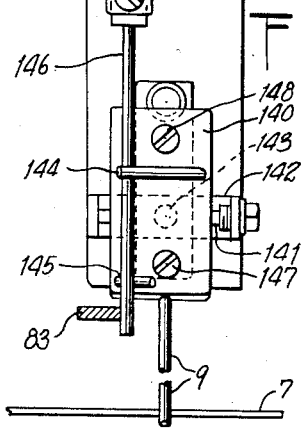
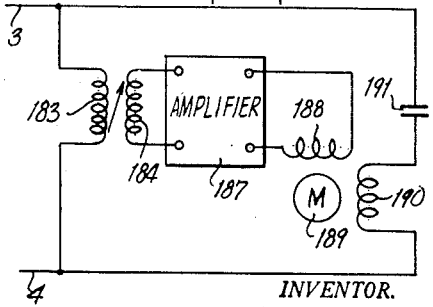
INVENTOR.
JOHN R. MACKAY
BY
Robert P. Dunham
ATTORNEY

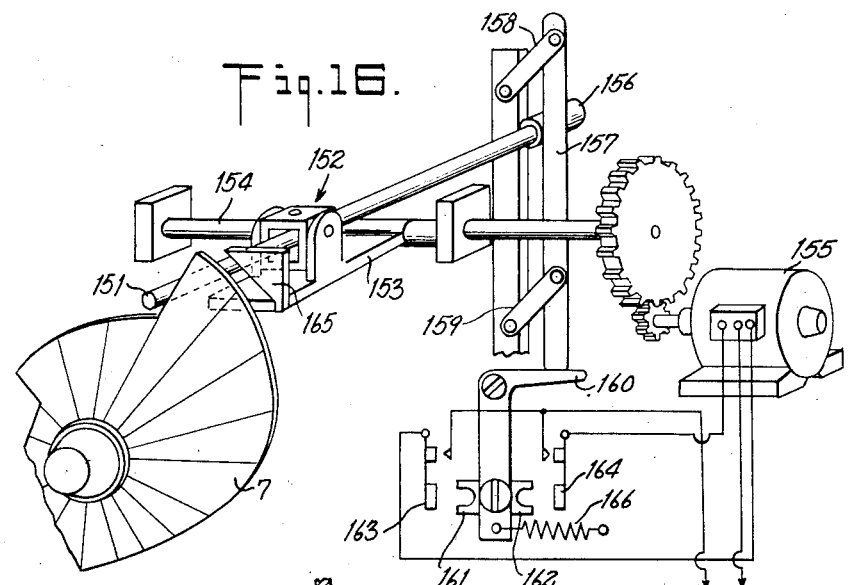
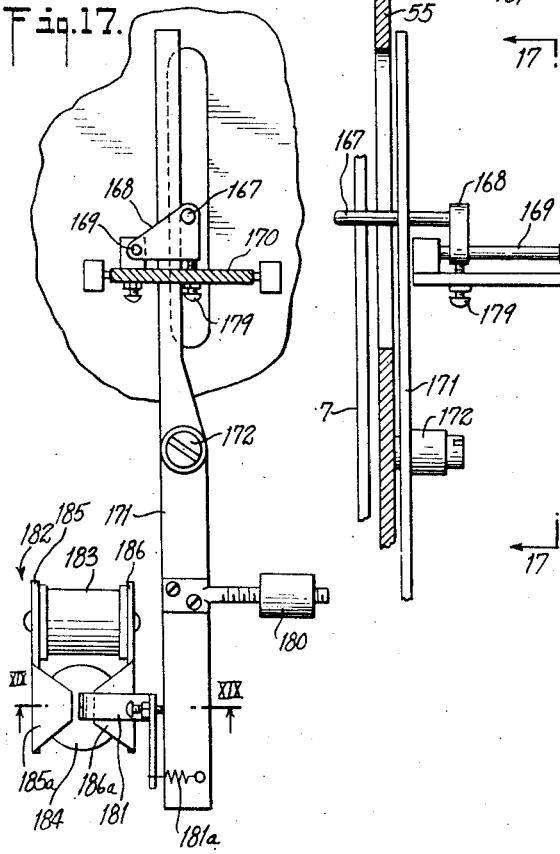
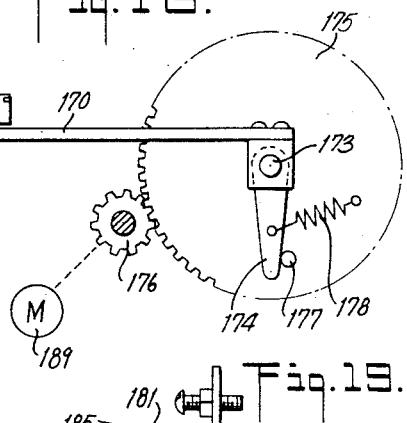
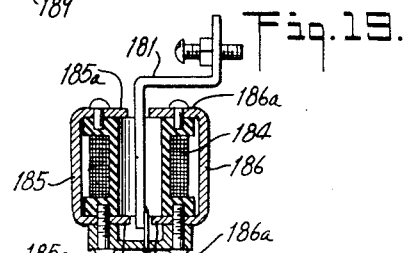

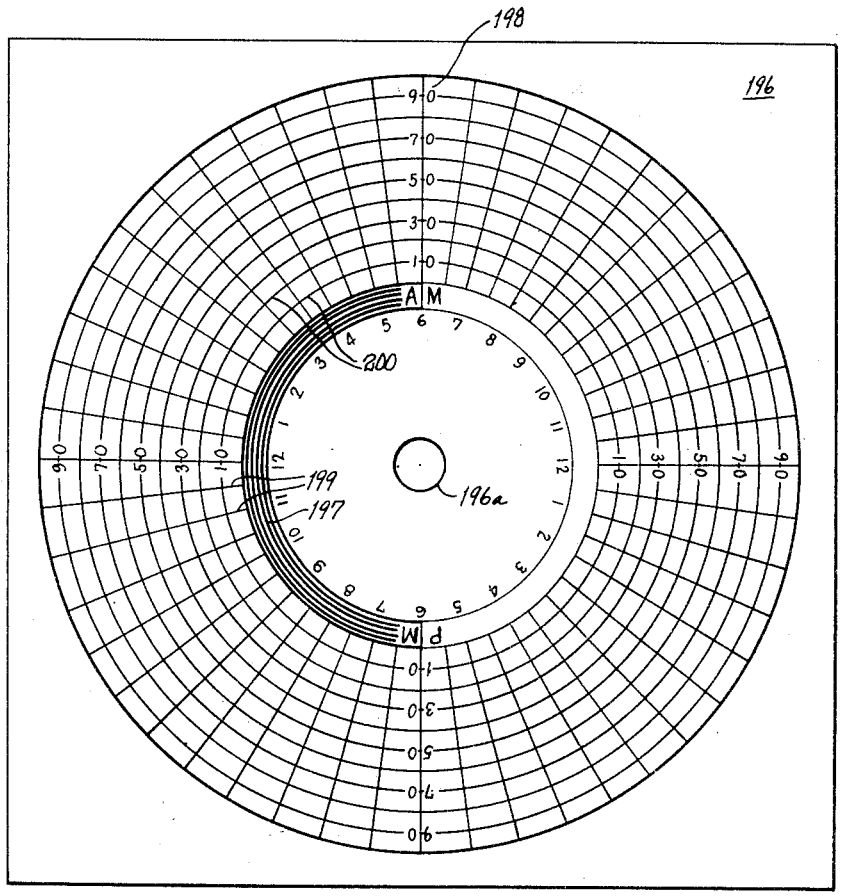

United States Patent Office 2,788,477
Patented Apr. 9, 1957

2,788,477

MOTOR CONTROL FOR CAM FOLLOWER

John R. MacKay, Packanack Lake, N. J., assignor to Wallace & Tiernan Incorporated, a corporation of Delaware Application September 14, 1953, Serial No. 380,064

25 Claims. (Cl. 318—28)

This invention relates to control apparatus, and particularly to a novel cam and follower construction for use in such apparatus.

The apparatus disclosed herein is intended for use in automatic control of industrial processes, and particularly in a program controller wherein the value of a variable condition in a process is varied with time according to a pre-established schedule or program. The novel apparatus includes a cam of readily deformable sheet material, for example, paper, and a sensitive follower mechanism capable of following a contoured edge of the sheet material.

While many features of the invention are especially useful in an industrial program controller, other features are of more general utility. As a particular example, the cam follower mechanism described herein may be used in connection with other cam structures.

A cam constructed of sheet material of this type is particularly useful in an industrial program controller. In many cases, it is desired to use the same controller at different times for different processes. Also, it is in many cases desired to modify the program established by the controller from time to time. It has been common in the art to provide such controllers with a contoured cam driven by a constant speed motor such as a clock motor. In such an arrangement, the contour of the cam determines the particular schedule or program to be followed by the process under control. In order to modify that process, it is necessary to remove the cam and substitute a different one.

In the cam operated program controllers of the prior art, the cams have been required to position a follower operatively connected to suitable control mechanism, typically electrical or pneumatic control mechanism. It has therefore been necessary to use cams and followers of substantial weight and rigidity, and to transmit substantial forces from the cam to the follower. It has been customary to construct the cams of sheet metal. Such cams require considerable force to cut or otherwise contour them, and it is difficult to apply the force required with hand tools and still secure the degree of accuracy required in control apparatus of this type. It has therefore been customary for the makers of program controllers to cut the cams in their factory, in accordance with the specifications of the users. The program controllers of the prior art have therefore been rather inflexible instruments, in that the user of a controller could not readily and quickly modify the program. Furthermore, such a modification has been expensive.

The metal cams of the prior art controllers are quite expensive. An error in the cutting of such cams, which are commonly known in the art as "program cams," may be costly, especially if it is made at a time when the cutting of a cam has otherwise been almost completed.

It is therefore an object of the present invention to provide a cam and follower apparatus in which the cam may be constructed of a sheet material which is inexpensive and whose contour may be readily changed. A typical material for such use is heavy paper or light cardboard, of a thickness which may readily be cut with a pair of scissors.

A further object is to provide such a cam and follower apparatus in which the follower engages the cam with a very light force so that the cam may run for a long period of time without appreciable wear.

Another object is to provide a cam and follower apparatus in which the principal force for moving the follower is derived from a motor rather than from the cam structure itself. A further object is to provide a cam and follower apparatus including a pilot follower which engages the cam surface with a light force and is supported on a heavier main follower driven by the motor, the motor being controlled in response to movements of the pilot follower with respect to the main follower in such a manner as to maintain the pilot follower engaging the cam periphery with a small force.

Another object is to provide an improved mechanical movement for positioning one movable member (a moving switch element) relative to a stationary member (a stationary switch element) in accordance with the position of a third movable member (the pilot follower) relative to a fourth movable member (the main follower) which supports the third member.

Another object is to provide, in apparatus of the type described, improved apparatus for controlling a reversible motor in such a manner that the motor will stop quickly when running in either direction, without overshooting the point where it is desired to stop.

Another object is to provide apparatus of the type described, including improved mechanism for operating the control system either in response to a cam and follower or in response to the setting of a manually operable control member.

The foregoing and other objects of the invention are attained in the apparatus described herein by providing a contoured program cam of fairly stiff paper or light cardboard. The cam is of generally circular contour and is suitably clamped on a hub formed on a shaft driven by a constant speed motor, such as a clock movement, either spring driven or synchronous motor driven. A lightweight pilot follower is lightly biased to engage the periphery of the cam. The pilot follower is movably supported on a heavier main follower, which is driven by a reversible motor. This motor is controlled by a suitable device responsive to the position of the pilot follower with respect to the main follower.

The motor which drives the main follower is of the split-phase type, and has one winding which is connected in series with a fixed condenser across the power supply lines. The other winding may be energized through either of two circuits, each of which includes a pair of rectifiers, the rectifiers in the two circuits being oppositely poled. When both circuits are complete, the four rectifiers cooperate and act as a rectifier bridge to provide full wave rectification so that said other motor winding is then supplied with direct current and rotation of the motor is effectively blocked. When one only of the two circuits is completed, the motor is supplied with half-wave rectified alternating current whose phase with respect to the current flowing through the condenser winding determines the direction of rotation of the motor. The control device actuated by the pilot follower may include a pair of switches, one in each of the two circuits for the rectifier winding of the motor.

The motor controlled by the pilot follower positions an electrical control device, in addition to driving the main follower. This electrical control device may preferably be a movable contact associated with a variable resistance element. A manually variable inductor is connected in parallel with this resistance element and the resistance and inductor are connected in a control system of the general type illustrated in my prior Patent No. 2,336,492, dated December 14, 1943.

The control system disclosed herein is an improvement over the system disclosed in my prior patent, particularly with reference to the arrangement provided for shifting between an automatic control, wherein a program cam is the major controlling factor and a manual control, wherein the program cam has no controlling influence on the system. For this purpose, the apparatus includes a control member manually movable between an automatic position and a manual position. In the manual position of this control member, the follower driving motor circuit is interrupted and both the main and pilot followers are lifted away from the cam. At the same time, the connection of the variable resistance to the electrical control system is shifted from the movable contact to a fixed contact, preferably at one terminal of the resistance. When the control member is shifted to the automatic position, the motor circuit is under the control of the pilot follower responsive control device, the main and pilot followers are moved to positions wherein the pilot follower engages the cam, and the connection of the variable resistance to the electrical system is again restored to the movable contact.

Other objects and advantages of this invention will become apparent from consideration of the following specification, taken together with the accompanying drawings. In the drawings:

Fig. 3 is a side view, partly in elevation and partly in section on the line III—III of Fig. 2, looking in the direction of the arrows, and with the outer casing omitted;

Fig. 4 is a rear elevational view of the apparatus illustrated in Figs. 2 and 3, with certain parts omitted and others broken away for purposes of clarity;

Fig. 5 is a fragmentary plan view of the apparatus of Figs. 3 and 4, with certain parts omitted, showing the main and pilot followers and the main follower driving mechanism;

Fig. 6 is a sectional view taken on the line VI—VI of Fig. 5 showing the pilot follower supporting mechanism;

Fig. 7 is a fragmentary elevational view taken on the line VII—VII of Fig. 3 looking in the direction of the arrows, showing the pilot follower and some of its related parts;

Fig. 8 is a fragmentary sectional view taken on the line VIII—VIII of Fig. 2, on an enlarged scale;

Fig. 9 is a fragmentary view, partly in elevation and partly in section on the line III—III of Fig. 2, showing the cam supporting hub;

Fig. 10 is a fragmentary illustration of a modified form of control system in which the present invention may be used;

Fig. 11 is a plan view of a modified form of pilot follower mechanism;

Fig. 12 is a side elevational view, partly in section, showing another modified form of pilot follower mechanism;

Fig. 13 is a front elevational view of still another modified form of pilot follower mechanism;

Fig. 14 is a side elevational view of the pilot follower mechanism in Fig. 13;

Fig. 15 is a plan view of the pilot follower mechanism of Figs. 13 and 14;

Fig. 16 is a partly diagrammatic, partly perspective view of a modified form of pilot follower and main follower mechanism;

Fig. 17 is a rear elevational view of still another modified form of pilot follower and main follower mechanism;

Fig. 18 is a side view, partly in section, of the mechanism of Fig. 17;

Fig. 19 is a sectional view, taken on the line XIX—XIX of Fig. 17, showing the inductor of that figure; and Fig. 20 is a wiring diagram of a motor control circuit using the mechanism of Figs. 17 to 19.

Fig. 21 is an elevational view of a program cam constructed in accordance with the present invention.

Figure 1:
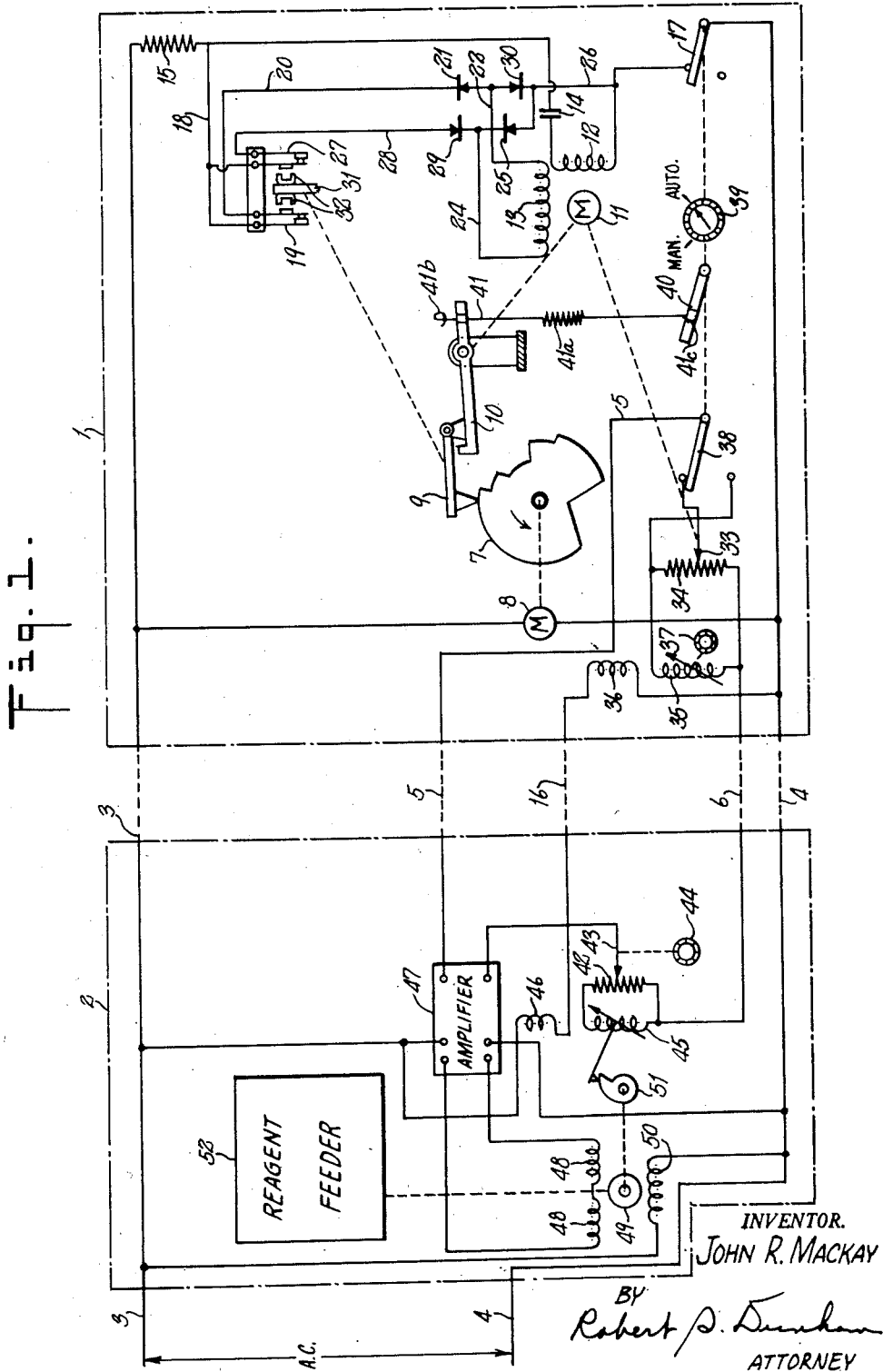
Fig. 1 is a diagrammatic illustration of a complete automatic control system including a program controller constructed in accordance with the invention.

*Fig. 1*

There is shown in Fig. 1 an automatic control system including a transmitter unit generally indicated at 1 and a receiver unit generally indicated at 2. These two units may be located remotely with respect to one another and are interconnected by common power supply lines 3 and 4 and also by line wires 5, 6 and 16.

The transmitter 1 includes a program cam 7 driven through suitable reduction gearing (not shown) by a constant speed motor 8 which is directly connected to the power lines 3 and 4. A pilot follower or finger 9 rests on the periphery of cam 7, and is pivotally supported on a main follower 10. The main follower 10 is pivotally mounted, and a motor 11 is operatively connected to the main follower 10 for moving it angularly about its pivot.

The motor 11 is of the alternating current split-phase type, having two windings 12 and 13. The winding 12 is connected across the power lines 3 and 4 in series with a fixed condenser 14, a fixed protective resistance 15 and a switch 17.

The winding 13 may be energized through either or both of two circuits. One of these circuits may be traced from the power line 3 through resistance 15, wire 18, a normally closed magnetic switch 19, wire 20, rectifier 21, wire 22, motor winding 13, wire 24, rectifier 25, wire 26, and switch 17 to the power line 4. The other circuit may be traced from line 3 through resistance 15, wire 18, normally closed magnetic switch 27, wire 28, rectifier 29, wire 24, winding 13, wire 22, rectifier 30, wire 26, and switch 17 to the power line 4.

The resistance 15 functions primarily to limit the current flow in the winding 13 when both switches 19 and 27 are closed. Under those conditions, the current flowing in winding 13 is substantially unidirectional, since it is full-wave rectified by the rectifiers 21, 25, 29 and 30. If the resistance 15 were not provided, there would be a tendency for the motor to overheat when both switches 19 and 27 are closed.

When one of the switches 19 and 27 is open, half-wave instead of full-wave rectification takes place, and the current is substantially reduced. The resistance 15 then represents a much smaller percentage of the total load between the lines 3 and 4 in the circuit of motor 11, and it does not seriously affect the operation of the motor.

The condenser 14 provides a phase displacement of approximately 90° between the alternating current flowing in motor winding 12 and the half-wave rectified alternations of current flowing to motor winding 13 through rectifiers 21 and 25, or through rectifiers 29 and 30.

The switches 19 and 27 are actuated by a lever 31 located between the switches and moved toward one or the other in accordance with the movement of the pilot follower finger 9 from a normal position with respect to the main follower arm 10. The lever 31 carries a pair of permanent magnets 32 which are respectively located adjacent the switches 19 and 27. These switches are self-biased to their closed position, and the spacing between the switches is such that when the lever 31 is in its middle position between the two switches, both switches are closed. Both the energizing circuits for motor winding 13 are then completed. The rectifiers 21, 25, 29 and 30 then act as a rectifier bridge to supply the winding 13 with direct current. This produces a unidirectional magnetic flux in the motor which effectively locks the motor against movement.

When both switches 19 and 27 are closed, then during each alternating current cycle there appear in the winding 13 of motor 11 two half-cycle pulsations of current, both pulsations flowing in the same direction. Concurrently, there appear in winding 12 two half-cycle pulsations of current opposite to each other in sign. Consequently, during one half of each alternating current cycle, the current in winding 13 and the current in winding 12 are both of the same sign and the motor tends to run in one direction, and during the other half of the alternating current cycle the currents are of opposite sign and the motor tends to run in the opposite direction. Under these conditions, when, for example, 60 cycle alternating current is used, the motor tends to reverse itself 120 times per second. However, on account of the inertia of the motor armature and the parts to which it is connected, no rotation takes place. If the motor has a low inertia armature, it will exhibit a slight tendency to oscillate at 120 cycle rate, but this tendency can be damped out by mounting a flywheel on the motor shaft, such as the flywheel 77 described below.

When either switch 19 or 27 is open only a single half-wave pulsation of current passes through the motor winding 13 during each alternating cycle, although two half-wave pulsations of alternately opposite polarity pass through the winding 12 during the same period. Thus during one-half of each cycle, a rotative torque is produced by the interaction of the current in motor winding 13 with one of the half-wave pulsations of current in motor winding 12, and during the other half of each cycle, no rotative torque is produced because of the absence of current in winding 13. It may therefore be seen that, with 60 cycle current, 60 unidirectional rotative impulses are produced by the motor windings each second when switch 19 or 27 is open. The motor armature is therefore caused to rotate a direction determined by the phase relationship between the pulsation of current in winding 13 and the concurrent half-wave alternations of current in winding 12.

If the finger 9 moves away from its normal position with respect to the arm 10, then the lever 31 is moved from its middle position between the two switches 19 and 27. If this motion continues for a very short distance, then one of the magnets 32 is moved close enough to its associated switch to open its contacts. It may be assumed, for example, that the cam 7 rotates counter-clockwise from the position shown in the drawing and that the finger 9 drops slightly from the position shown when it reaches the nearest shoulder of the cam, and that this movement of the finger 9 causes the lever 31 to move to the left from the position shown, so that its left-hand magnet 32 actuates the switch 19 to open position. The winding 13 is then supplied with current only through the switch 27, so that winding 13 then receives half-wave rectified alternating current. This current sets up a magnetic flux in the motor 11 which reacts with the flux produced by winding 12 so as to cause rotation of motor 10 in a direction to drive the main follower arm 10 downwardly. This motion continues until the pilot follower finger 9 is restored to its normal position with respect to arm 10, whereupon the lever 31 is restored to its normal middle position and both switches 19 and 27 are again closed, and the motor is blocked against further rotation.

If the pilot follower finger 9 moves upwardly with respect to arm 10 then the lever 31 is moved to the right and the switch 27 is opened. The winding 13 is then energized through rectifiers 21 and 25 and so receives half-wave rectified alternating current of the opposite phase from that discussed in the previous case, so that the motor 11 then rotates in a direction to drive the arm 10 upwardly. This motion continues until the normal positional relationship between pilot follower arm 9 and main follower arm 10 is re-established.

The motor 11 also drives a contact 33 which is movable along a resistance 34. An inductor 35 is connected permanently in parallel with the terminals of resistance 34. The inductor 35 forms the secondary of a variable coupling transformer of the general type illustrated in Figs. 2 to 4 of my Patent No. 2,336,492, previously mentioned, and having a primary winding 36 permanently connected across the power lines 3 and 4. The coupling between windings 35 and 36 may be manually varied by means of a control knob 37.

A switch 38 is movable between an upper position, shown in the drawing, wherein the sliding contact 33 is connected to the wire 5 and a lower position wherein the wire 5 is connected to the upper common terminal of the resistance 34 and inductor 35. The switch 38 is mechanically connected to a control knob 39, and the knob 39 is also operatively connected to the switch 17. The knob 39 is movable between an automatic position and a manual position, identified by legends in the drawing. In addition to the switches 17 and 38, the knob 39 controls a lever 40 which is connected to the main follower arm 10 through a lost motion connection comprising wire 41 having a spring section 41a and loops 41b and 41c at its opposite ends. When the switches 17 and 38 are in their automatic position, the energizing circuits for the windings of the motor 11 are closed at switch 17 and the contact 33 is connected to the wire 5. The loop 41c at the lower end of wire 41 is fixed to the lever 40, while the wire 41 passes freely through an aperture in follower arm 10 at a locality sufficiently below the upper loop 41b so that the main follower arm 10 is free to move throughout its range of travel without interference from the wire 41. When the knob 39 is moved to its manual position, the switches 17 and 38 are moved to their opposite positions, thereby opening all the energizing circuits for motor 11, and connecting wire 5 to the upper terminal of resistance 34. The lever 40 then moves wire 41 downwardly, pulling loop 41b down until it engages arm 10 and rotates it clockwise, thereby lifting the follower finger 9 off the cam 7. The driving connection between the motor 11 and follower arm 10 must include a lost motion connection to permit this movement of the lever arm. The latter lost motion connection is not shown in Fig. 1.

The receiver 2 includes mechanism such as that described in detail in the corresponding receiving apparatus in prior Patent No. 2,336,492 previously mentioned. Briefly, this includes a variable resistance 42 having a movable contact 43 adjustable by means of a knob 44. An inductor 45 is permanently connected in parallel to the terminals of resistance 42. The inductor 45 forms a secondary of a variable coupling transformer having a primary winding 46. The primary winding 46 of receiver 2 and the primary winding 36 of transmitter 1 are permanently connected in series across the power lines 3 and 4, through the line wire 16. The output terminals of an amplifier 47 are connected to the opposed shading coils 48 of a shading coil motor 49. Motor 49 has a main field winding 50 connected permanently across the lines 3 and 4. Motor 49 drives the variable inductor 45 through a cam 51 provided to give that inductor a linear effect in the balanced circuit described below in response to a movement of the motor. The motor 49 is also drivingly connected to a suitable load device, typically a reagent feeder indicated diagrammatically at 52.

The amplifier 47 has its input terminals connected to a normally balanced circuit including the resistance 42 and inductor 45 of the receiver in series with resistance 34 and inductor 35 of the transmitter. As explained in detail in my Patent No. 2,336,492, previously mentioned, the rotor windings 35 and 45 are so oriented with regard to their respective stator windings 36 and 46 that the potentials induced in the two rotor windings are opposite in phase. The magnitudes of the potentials induced in the windings 35 and 45 are determined by their angular positions with respect to the primary windings 36 and 46. When the magnitudes of the two potentials are the same (and providing the moving contacts on resistors 34 and 42 are set alike), no potential appears at the input terminals of the amplifier 47.

However, if the potential induced in winding 35 is higher than that in winding 45, the difference between these two potentials will be impressed on the input terminals of the amplifier 47, and the phase of this difference potential will correspond to that of the potential induced in rotor winding 35. Conversely, if the potential induced in rotor winding 35 is lower than that induced in rotor winding 45, the phase of the difference voltage will be that of the potential induced in winding 45, i. e., 180° out of phase with the potential induced in winding 35.

The angular relationship between rotor windings 35 and 45 and their respective stator windings 36 and 46 determine the magnitudes of the induced potentials. Also, it determines whether the induced potential in either rotor is of the same or opposite phase as that of the associated stator winding. No angular position of a rotor can result in an intermediate phase of the induced potential. If the opposed potentials become unbalanced, for example by a movement of contact 33, then a signal is applied to amplifier 47 and the shading coils 48 are thereby energized with current of the proper phase to cause rotation of motor 49 in a direction to rebalance the circuit by actuation of cam 51 and variable inductor 45. The load device 52 is, of course, adjusted concurrently by the motor 49. It may therefore be seen that the load device 52 is under the control of the apparatus which determines the potential produced in the balanced circuit by the resistance 34 and inductor 35 of the transmitter 1.

When the control knob 39 is in the automatic position, then the reagent 52 is controlled in accordance with the position of sliding contact 33 along the resistance 34. If the contact 33 is moved by motor 11, then the potentials in the balanced circuit become unbalanced and the motor 49 is driven in a direction to restore that balance by its variation of the inductor 45. When the knob 39 is moved to the manual position, the sliding contact 33 is no longer connected in the circuit, and hence its position has no effect upon the balance of the potentials therein. The potential produced at the transmitter is then controlled by the variable inductor 35 alone, which may be manipulated by knob 37.

When the knob 39 is in its automatic position, the inductor 35 determines the total potential across the terminals of the resistance 34. Under such conditions, the setting of knob 37 determines the difference in potential which will be introduced in the balanced circuit by a given movement of contact 33. Consequently, it determines the responsive movement of the inductor 45 in the receiver which is required to balance that given movement of contact 33. Hence, it determines the range of movement of motor 49 and the devices driven thereby in response to a movement of contact 33 throughout its range. The knob 37 and inductor 35 in this particular example then function as a secondary proportioning or "dosage" control.

*Figs. 2 to 9*

These figures illustrate the mechanical details of the transmitter unit 1 of Fig. 1, particularly the cam and follower apparatus. In these figures, those parts which are illustrated in Fig. 1 have been given the same reference characters, even though the parts in question may be shown diagrammatically in Fig. 1 and in structural detail in these figures.

Figure 2:
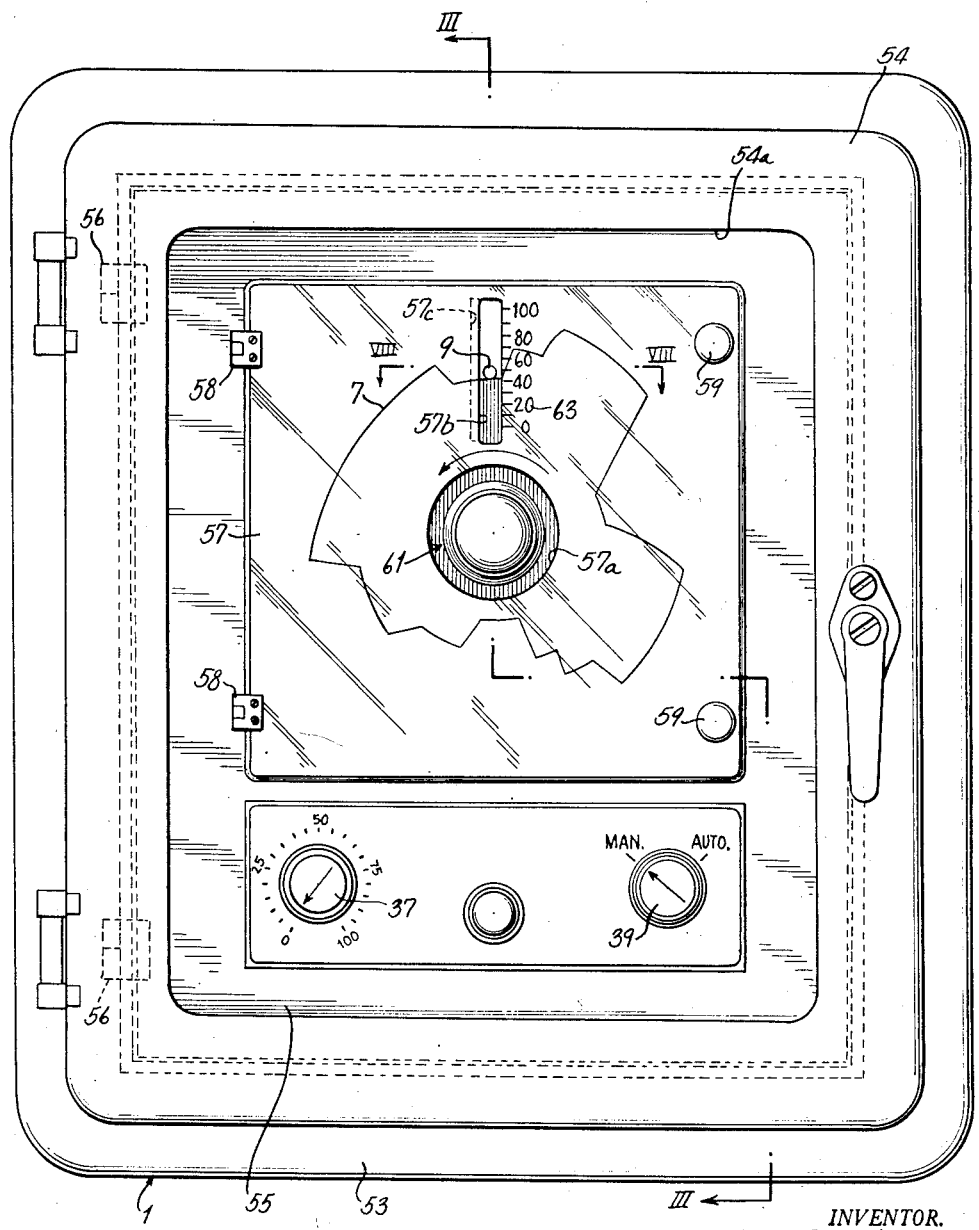
Fig. 2 is a front elevational view of a program controller embodying the invention.

There is shown in Fig. 2 a program rate controller which corresponds generally to the transmitter 1 of Fig. 1. This controller is mounted in a housing 53, having a front door 54 provided with a sight opening 54a. A panel 55, visible through the sight opening 54a, is hinged at 56 to the housing 53. The panel 55 supports all the principal parts of the cam and follower apparatus. A plate 57 of glass, plastic or other transparent material is mounted on the front of the panel 55 by means of hinges 58. The side of plate 57 opposite the hinges is fastened to the panel by means of knurled head thumb screws 59. The thumb screws 59 extend through bushings 60 fixedly mounted in the plate 57 and having spacing flanges 60a on their inner sides. The screws 59 are threaded for engagement with correspondingly threaded openings in the panel 55. When the screws 59 engage their respective openings in panel 55, a fixed spacing is maintained between panel 55 and the glass plate 57 by the spacing flanges 60a. The hinges 58 are also constructed to maintain the same fixed spacing.

The glass plate 57 is provided with a central aperture 57a through which projects a knob 61 forming part of a hub structure carried on a shaft 62 of the motor driven clock mechanism 8. Above the opening 57a, the glass plate 57 is provided with a vertically extending slot 57b. A scale 63 is fastened, engraved or painted on the plate 59 on one side of the slot 57b. The opposite side of the slot 57b is beveled on its inner surface, as shown at 57c in Fig. 8.

The cam chart 7 is clamped on the hub of shaft 62 by means of knob 61, and rotates with the hub in a counter-clockwise direction as viewed in Fig. 1. The spacing between the glass plate 57 and the panel 55, as determined by the spacing flanges 60 and the hinges 58, is made wide enough to receive the program cam 7 freely, so that it may turn without restriction, but narrow enough so that the cam is held against deflection from its normal plane to any substantial extent.

The cam 7 may be formed from a cam blank of any suitable sheet material whose contour can be readily changed, for example, by cutting with a pair of scissors. Paper or light cardboard is presently preferred. Excellent results have been obtained with paper 0.0095 in. thick and weighing 216 lbs. per 1000 sheets of 24" x 36" dimensions. It is considered that satisfactory results can be secured with paper stock varying in thickness from about 0.0070 inch to about 0.0210 in. and in weight from 200 lbs. to 500 lbs. per 1000 sheets of 24" x 36" stock. Paper thinner than this range does not wear well, and paper thicker than this range does not cut easily. It will be readily recognized that other ranges of thickness will be suitable for other materials, for example, various plastics.

The panel 55 is provided with a slot 55a (Fig. 8), which is generally aligned with the slot 57b in the plate 57. The pilot follower finger 9 extends through the slots 55a and 57b and engages the upper peripheral surface of the program cam 7.

As the program cam passes the slots 57b and 55a, it is not normally guided by the plate 57 and panel 55. However, at that point it may under some conditions be subjected to an outwardly deflecting force imposed by the follower finger 9, or resulting from warpage of the paper or other thin material from which it is made. In case the finger 9 deflects a portion of the periphery of the cam outwardly as it passes the slot 57b then as the deflected portion continues to move with the rotation of hub 61, it engages the beveled edge 57c of the plate 57 and is guided back toward its proper plane.

The pilot follower finger 9 (see Fig. 3) is mounted on the front end of the main follower arm 10 by means of a universal joint structure generally indicated at 64 and described more completely below. The arm 10 extends rearwardly from the panel 55. A block 65 is fixed on the upper side of the arm 10 about two-thirds of the way back from its front end. A pivot shaft 66 extends through and is fixed to the block 65. The ends of the pivot shaft 66 are journaled in a pair of plates 67, 68 mounted on brackets 69 which are attached to the panel 55. The arrangement is such that the pivot shaft 66 is aligned with the follower finger 9. This alignment provides a linear relationship between the motion of the pivot shaft 66 and the motion of finger 9, so that this relationship may be reflected in the scale 63 and in the chart markings provided on the program cam 7. A pair of lugs 70 project inwardly from the plate 67 and threadedly support adjustable stop screws 71 which lie in the path of the follower arm 10 and determine the limits of its movement.

The pivot shaft 66 has fixed thereon a downwardly depending arm 72 (Fig. 4). Alongside the arm 72, there is rotatably mounted on the shaft 66 a segment gear 73 carrying a pin 74 projecting into the path of arm 72. The teeth of the segment gear 73 engage a pinion 75 forming part of a gear train generally indicated at 76 and driven by the motor 11. A flywheel 77 is connected to the shaft of motor 11.

Due to the low inertia of the armature or rotor of the average small two-phase motor 11, it will respond to a single alternation or pulsation of the current flowing in its windings 12 and 13. This tends to cause the armature to oscillate or vibrate at either the frequency or double the frequency of the alternating current source, with resulting noise and wear of the motor shaft pinion and meshing gear. By installing the flywheel 77 on the motor shaft, its inertia is increased to the point where it cannot appreciably respond to individual alternations and pulsations of current, and thus the noise and excessive wear and tear on the gears is eliminated.

Though the use of a fly wheel or a high inertia armature is normally considered conducive to hunting (overshooting of the balance point), the direct current obtained from the bridge rectifier, upon the closing of both magnetic switches, produces such an effective braking action in the apparatus disclosed that substantially no hunting occurs.

The lower ends of the plates 67, 68 are connected by a pair of frame members 78. A shaft 79, aligned with shaft 62 which carries hub 61, is journaled at its ends in ball bearings 78a carried by the frame members 78. A lever 80 is fixed on the shaft 79 and projects upwardly and downwardly therefrom. The upper end of lever 80 is bent over to the left, as viewed in Fig. 3 and has fastened thereto the web portion of a channel shaped member 81. A shaft 82 is journaled in the upwardly projecting end flanges of the channel shaped member 81 and projects beyond those flange portions in both directions as shown in Fig. 3. Fixed on the front end of shaft 82, i. e., the left-hand end as viewed in Fig. 3, is an upwardly extending member 83. Fixed on the rear or right-hand end of shaft 82 is an arm 84, best seen in Fig. 4, which projects at right angles to the lever 80. Another arm 85 is fixed on lever 80 and extends generally parallel to the arm 84. A spring 86 is stretched in tension between the arms 84 and 85 and biases them toward each other. The motion of the arms 84 and 85 toward one another is limited by a stop screw 87 threaded in the arm 85 and extending toward the arm 84.

The structure just described, including the shaft 82, arms 84 and 85, spring 86 and stop screw 87, serves as a strain relief connection between the extension member 83 and the lever 80. The spring 86 normally holds the arm 84 against the end of stop screw 87, so that the member 83 normally functions as an upward extension of lever 80. The strain relief mechanism functions only under certain exceptional conditions to be described below.

The lower end of lever 80, which lever corresponds generally to lever 31 of Fig. 1, adjustably supports a suitable carrier 88 on which are mounted the magnets 32 which actuate switches 19 and 27. The latter switches are mounted on a plate 89 fixed to the panel 55. A pair of adjustable stop screws 90 are also mounted on the plate 89 to limit the movement of the lower end of lever 80 so as to prevent the magnets 32 from coming in contact with the glass enclosed mercury switches 19 and 27, and to limit the travel of the magnets away from their central position to the minimum required for the operation of the switches.

Mounted on two short posts carried by plate 89 is a short strip 192, which prevents the relatively light-weight and delicate lever arm 80 from being pulled outwardly and bent during adjustment of the magnets.

The carrier 88 is adjustably mounted on the lower end of lever 80 by means of a clamping screw 193 and an eccentric 194 having a slotted head and operating in a slot 88a formed in the carrier 88. By loosening the screw 193 and turning eccentric 194, the carrier 88 can be adjusted angularly on lever 80.

The magnets 32 are adjustably mounted on the carrier 88 by means of brackets 195 having slots 195a to receive screws. By loosening these screws, the positions of the magnets may be adjusted laterally.

These several adjustments are required because of manufacturing variations in the magnets and the magnetic switches.

The lever 80 is pivotally mounted on the stationary framework of the apparatus. The pilot follower finger 9 is mounted on the main follower arm 10 which is rotatable on the pivot shaft 66. There is provided a novel mechanical movement which includes the universal joint 64 and which transmits the motion of the pilot follower finger 9 with respect to the follower arm 10 to the lever 80, so that the angular position of the latter with respect to the frame corresponds to the position of the follower finger 9 relative to the follower arm 10. This mechanical movement may be best understood by reference to Figs. 5, 6 and 7.

Referring to Fig. 6, it may be seen that there is fixed on the front or left-hand end of the follower arm 10 an upstanding block 91 having a central aperture 91a extending through it from left to right and communicating with cylindrical recesses 91b and 91c formed in the front and rear faces respectively of the block 91. The follower finger 9 extends through the aperture 91a. On the rear side of the block 91, there is fixed on the finger 9 a cone 92 having a flat base whose diameter is substantially the same as the diameter of the recess 91c. The conical surface of cone 92 faces to the right as viewed in Fig. 6.

On the left-hand side of the block 91, there is fastened on the finger 9 a collar 93, which serves as a retainer for a coil spring 94 whose opposite end abuts against a flanged sleeve 95 received in the recess 91b.

Note that the spacing between collar 93 and sleeve 95 is less than the depth of each of the recesses 91b and 91c. This relationship prevents the possibility of the inner surfaces of sleeve 95 and cone 92 from riding up on the outer surfaces of the block 91, which might otherwise occur, for example, when inserting a program cam, or when making adjustments.

The normal position of follower finger 9 is shown in Fig. 6. In this position, the front end of the finger 9 is tilted upwardly slightly with respect to its central position in which the flat base of the cone 92 engages the bottom of recess 91c. The coil spring 94 tends to bias the finger 9 toward that central position, but the finger 9 is held upwardly therefrom, in its normal position by the cam chart 7, as explained in more detail below. This normal position of the finger 9 corresponds to the intermediate position of the lower end of lever 80, in which the magnets 32 are equally spaced from the switches 19 and 27.

Referring now to Figs. 5 and 7, there is fixed on the upper part of the block 91 a plate 96 having a rearwardly projecting channel-shaped extension 96a. A pivot shaft 97 is journaled in the flanges of the channel shaped extensions 96a. Fixed on the shaft 97 for rotation therewith is a lever 98 having its end adjacent the shaft 97 bent over to form a channel shaped section, as indicated at 98a. A pin 99 is fixed in the channel shaped part of lever 98 and extends downwardly therefrom and engages the surface of the cone 92. The other end 98b of lever 98 projects forwardly from the shaft 97 in a direction generally parallel to the finger 9. The forward end 98b of the lever 98 engages the side of the member 83 which acts as an upward extension of lever 80. A pin 100 is attached to the outer end of lever 98 to prevent the member 83 from slipping out of contact with the lever 98 in the extreme upper position of main follower 10.

The rear end of the finger 9 (the right hand end as it appears in Figs. 3 and 6) projects beyond the cone 92. There is fastened on the top of the block 91 a plate 104 which projects rearwardly and has a downturned end extending adjacent the rear end of the finger 9. This plate 104 serves as a stop to limit the upward movement of the back end of finger 9. The distance between the downwardly extending end of stop 104 and the shaft of finger 9 should be such that substantially no upward movement of finger 9 can occur beyond that which brings its axis to a right angle with the bottom surface of the recess 91c.

There is fastened on the lever 80, near its lower end, an adjustable weight 105. The weight serves to apply a light biasing force to the lever 80, tending to rotate it counterclockwise about the shaft 79, so that the upper extension 83 is biased into engagement with the projecting end 98b of the lever 98, thereby biasing that lever in a counterclockwise direction as viewed in Fig. 5 and biasing the pin 99 into engagement with the surface of the cone 92. This mechanism cooperates with spring 94 in biasing cone 92 toward its central position, in which the base of the cone engages the bottom of recess 91c.

The resistance 34 is illustrated in external elevation in Fig. 4. The structure there shown is a common commercial structure, consisting of a resistance of annular cross-section and having a sliding contact moving along its inside surface. This contact is carried by an insulated extension of the shaft 106 which carries pinion 75. The position of the contact finger on the resistance 34 is therefore determined concurrently with the angular position of the main follower arm 10.

The structure by which the program cam 7 is clamped on the shaft 62 is illustrated in detail in Fig. 9. It includes a hub 107 fastened by any suitable means to the shaft 62 for rotation therewith. The hub 107 is provided with a peripheral flange 107a on which is received a backing disc or plate 108. The program cam 7 has a central aperture adapted to slide on the surface of hub 107, which has another flange 107b lying in the same plane with the front surface of the plate 108. After the program cam is mounted on the hub, there is placed on the hub the knurled knob 61, which rotatably and slidably supports a ring plate 109. The knob 61 is provided with internal threads adapted to engage external threads on the forward end of hub 107. By tightening the knob on these threads, the plate 109 is forced against the plate 108 and the program cam 7 is clamped between the plates. The program cam 7 can readily be removed by simply unscrewing the knob 61. It is of course necessary, in order to remove the program cam, first to unscrew the screws 59 and swing the glass plate 57 outwardly on its hinges 58.

The control knob 39 (Fig. 3) is fixed on a shaft 101 which carries a downwardly depending crank arm 102 having a projecting pin 103 at its end. The lower end of the wire 41 is fixed to the extremity of pin 103, and the upper end of wire 41 passes through a suitable aperture near the rear end of follower arm 10. When the knob 39 is in the automatic position, as shown in the drawings, the upper end of wire 41 projects through the end of lever 10 sufficiently so that a substantial space exists between the loop 41b and the lever 10. The lever 10 is therefore free to be positioned by the motor 11 without interference from the wire 41.

*Operation of Figs. 2 to 9*

Considering the operation first in general terms of the primary cause and the ultimate effect, then when the pilot follower finger 9 moves downwardly from its normal position with respect to follower arm 10, the motor 11 is energized for rotation in a direction to drive the arm 10 downwardly. If the finger 9 is moved upwardly from its normal position, the motor 11 is energized to drive the arm 10 upwardly. In either event, the direction of rotation of the motor is that which will restore the normal positional relationship between the finger 9 and the arm 10. If the finger 9 is moved either to the right or to the left from its normal position, the motor 11 is controlled in a direction to move the arm 10 upwardly. Deflection of the finger 9 to the right or to the left is an indication that the finger is engaging the program cam 7. Since it is desired to limit the force of engagement between the finger 9 and the program cam 7, it is desirable to have the main follower arm 10 driven upwardly in response to a lateral movement of the finger 9 in either direction. A composite lateral and upward movement of the finger 9 will of course cause the arm 10 to move upwardly, or away from the cam. A composite downwardly and lateral movement will cause the arm 10 to move in a direction depending upon which of the component movements dominates. Conceivably, if both the downward and lateral movements are equal and small, no movement of the arm 10 would result. However, if any appreciable movement of that type takes place, the effect of the lateral movement will predominate and the arm 10 will be moved upwardly.

While in the mechanism shown, the program cam 7 rotates and moves the finger 9 upwardly to move it away from the cam and downwardly to move it toward the cam, it should be recognized that this specific directional relationship of the parts is not necessary to the utilization of the invention, although it is convenient. For example, the finger 9 could be moved in any radial direction with respect to the center of rotation of the cam 7 or it could conceivably be moved in some other direction which is not radial, provided that direction has a substantial radial component. As another alternative, the finger 9 and follower mechanism could be used in connection with a cam whose movement is linear rather than angular. In this specification, the terms downwardly and upwardly are used to describe movement of the finger 9 respectively toward and away from the base of the cam. In using these terms, it is not intended to limit the invention to any specific angular relationship between the path of movement of the cam and the paths of movement of the follower finger 9 and the follower finger 10.

Considering the operation in more detail, and referring first particularly to Fig. 6, it may be seen that a downward movement of the left-hand end of the finger 9, as it appears in that figure, moves the cone 92 more closely toward the bottom of the recess 91c. The pin 99 (Fig. 7) follows this movement under its bias and the lever 98 therefore moves counterclockwise as viewed in Fig. 5, with a concurrent movement of extension 83, and lever 80 moves counterclockwise about shaft 79, as viewed in Fig. 4. This carries the right-hand magnet 32 toward the switch 27, and as the movement continues, the contact at switch 27 is interrupted, causing rotation of the motor 11, as described in connection with Fig. 1. Switch 27 is connected in the circuits of motor 11 so as to cause its rotation in a direction to drive the left-hand end of follower arm 10 downwardly as it appears in Fig. 3. The arm 10 continues to move downwardly, carrying with it the finger 9, until the finger 9 engages the periphery of the cam chart 7 with sufficient force to lift it back to its normal position with respect to the arm 10. When the finger 9 is returned to its normal position, the cone 92 is tilted back to its normal position as shown in Fig. 6, the pin 99 is moved rearwardly and the lever 98 is moved clockwise as viewed in Fig. 5, carrying lever extension 83 and lever 80 clockwise as viewed in Fig. 4 until the right-hand magnet 32 is moved far enough so that the contacts of switch 27 close again.

The stop 104, as previously mentioned, prevents finger 9 from moving downwardly beyond a position at right angles with the bottom surface of recess 91c. If the finger 9 were allowed to so move, the following movement of pin 99 would be reversed, and the motor would run in the wrong direction.

If the finger 9 is moved upwardly from the position in Fig. 6, then the cone 92 is pivoted clockwise about its lower edge as viewed in that figure, thereby carrying the pin 99 farther back and turning the lever 98 clockwise away from its normal position. The extension 83 and lever 80 are thereby carried clockwise from their normal position and the left-hand magnet 32 is moved toward the switch 19 and causes it to open its contacts, thereby initiating operation of motor 11 in a direction to drive the left-hand end of arm 10 upwardly, as viewed in Fig. 3.

Referring now to Fig. 5, it may be seen that a deflection of the finger 9 to the left as viewed in that figure would cause the cone 92 to pivot about the right-hand edge of the base of the cone, thereby carrying the pin 99 in a direction to move lever 90 clockwise from its normal position. Also, it may be seen that a movement of finger 9 to the right from the position of Fig. 5 would cause the cone 92 to pivot about the left-hand edge of its base, again moving the pin 99 backwardly and turning the lever 98 clockwise from its normal position. Hence a movement of the outer end of finger 9 to either the left or right causes the lever 98 to move clockwise from its normal position. As explained above, such a movement of lever 98 causes the motor 11 to run in a direction to drive the left-hand or forward end of the follower arm 10 upwardly.

When the lever 80 is moved clockwise as viewed in Fig. 4 from its normal position, its range of movement is limited by the left-hand stop 90. It may sometimes occur that the movement of lever 80 will be so stopped, and that the movement of the cone 92 which is driving the lever extension 83 in a clockwise direction continues. Under such conditions, the strain relief spring 86 will allow the clockwise movement of extension 83 to continue by pivoting about the shaft 82, while the lower end of lever 80 remains stationary.

By the action just described, the finger 9 yields without damaging the cam chart until such time as the motor 11 has driven it upwardly into proper relationship with the edge of the cam chart.

It is important that the magnets only move sufficiently to operate the switches. If they move closer than this, the attraction between the magnets and the magnetic members of their respective switches will increase sufficiently to greatly reduce the sensitivity of the follow-up system. When too close an approach is permitted, the magnetic attraction may be sufficient to overcome the biasing effect of counterweight 105 and maintain member 83 out of contact with pilot follower finger 9.

When the knob 39 is moved from its automatic position to its manual position, wire 41 is stretched and loop 41b at its upper end engages the upper surface of follower arm 10 and carries it downwardly, thereby raising the left end of follower arm 10, as viewed in Fig. 3, and carrying the finger 9 upwardly away from the cam to the end of its range of movement. During such an operation, the arm 72 (see Fig. 4), which is fixed on shaft 66, moves away from the pin 74. Since the operation of the knob 31 to its manual position interrupts the supply of electricity to motor 11, the pin 74 remains in its previous position until the knob 39 is restored to its automatic position.

The follower arm 10 is unbalanced with respect to the shaft 66, with most of its weight forwardly of that shaft. Consequently, when the knob 39 is moved to its automatic position and the wire 41 moves upwardly through the aperture in the rear end of arm 10, the weight of arm 10 carries it downwardly to bring the arm 72 again into engagement with pin 74. These two parts are held in engagement by the weight of the arm 10 and the structure supported thereon so that the arm 10 follows the movements of motor 11.

It should be noted that the cam driving motor 8 is left connected to the line in both the manual and automatic positions of knob 39. The motor 8 is commonly a clock motor, and rotates the cam 7 once in a predetermined period of time. In such a case, it is usually desired to run the system manually only as a temporary expedient, and to return to the regular schedule of automatic control as soon as convenient. Consequently, the cam is kept running at its usual speed during manual control periods, so that when automatic control is restored, it will be at the proper part of the cycle.

*Fig. 10*

This figure illustrates diagrammatically a modified form of control system in which the cam follower apparatus described in connection with Figs. 2 to 9 may be used. This system differs from that shown in Fig. 1 in that the automatic control is responsive both to the time-controlled cam and to an independently varying condition. It will be recalled that in the control system of Fig. 1, when that system is operating on the automatic control as opposed to the manual control, then the cam is the primary controlling factor, with a secondary manual modulating control. In the system of Fig. 10, the primary control is always automatic, and the secondary control may be either manual or time-controlled.

Referring to Fig. 10, there is shown a transmitter unit 110 which may be remote from the controlled device and also from the program controller apparatus shown generally at 111. The transmitter 110 operates in response to the liquid level in a tank 112 having a float 113. The float 113 is fastened on the end of a cable 114 which extends over a pulley 115 and has a balance weight 116 attached to its opposite end. A cam 117 is connected to the shaft of pulley 115 and a follower 118 of the cam 107 controls a variable inductor 119. The inductor 119 is the secondary winding of a variable coupling transformer having a primary winding 120 connected across the power supply lines 3 and 4, or alternatively connected in series with the primary of another variable coupling transformer in a receiver such as receiver 2 of Fig. 1, and across supply lines 3 and 4.

The terminals of the secondary winding 119 are connected through conductors 121 and 122 to the program controller apparatus 111, which is generally similar to the transmitter 1 of Fig. 1. Like the transmitter 1 of Fig. 1, the apparatus 111 is connected to a receiver 2 (not shown in Fig. 10) by means of power lines 3 and 4 and line wires 5 and 6.

The apparatus 111 includes a first resistance 123 having a sliding contact 124 driven by a motor 11 in the same manner that the contact 33 is driven by motor 11 in Fig. 1. Another resistance 125 has a contact 126 slidable along the resistance by means of a manually settable knob 127. The manual-automatic control knob 39 of Fig. 10 corresponds to its counterpart in Fig. 1, but in Fig. 10 controls two switch arms 128 and 129.

When the knob 39 is in the automatic position, as shown in Fig. 10, the resistance 123 is connected across the terminals of inductor 119 through switch 128, and the contact 124 is connected to the conductor 5 leading to the receiver unit through switch 129. Under these conditions the load device at the receiver is controlled in proportion to the liquid level in the tank 112, and the secondary control superimposed thereon is established as a function of time in accordance with the contour of the cam chart which controls motor 11.

When the knob 39 is moved to its manual position, resistance 123 and contact 124 of the program controller 111 are disconnected from the balanced circuit, and are replaced respectively by resistance 125 and contact 126. The load device at the receiver is then controlled in proportion to the liquid level in tank 112 as before, but the extent of control exercised is now determined by the setting of the manually operable knob 127.

Fig. 11

This figure illustrates a modified form of mechanical movement which may be substituted for the mechanical movement which connects the pilot follower finger 9 and the lever extension 83 in Figs. 2 to 9.

In Fig. 11 there is mounted on the forward end of the arm 10 a bracket 130 which supports a block 131. The block 131 is provided with recesses 131a and 131b in its front and rear faces respectively. A conically tapered spring 132 is retained in compression between the recess 131a and a collar 133 fixed on the finger 9. The finger 9 extends through an aperture in the block 31 and at the rear side thereof carries a cone 134, whose base rests against the bottom of the recess 131b and whose apex faces rearwardly. The lever extension 83 engages one surface of the cone 134 directly, without any intervening mechanism such as the motion multiplying lever 98 of Figs. 2 to 9.

Operation of Fig. 11

Operation of the mechanical movement shown in this figure is analogous to that of the mechanical movement of Figs. 2 to 9. In other words, the mechanism is responsive to a right, left or upward deflection of finger 9 from its normal position by moving the lever 83 counterclockwise from its normal position, or to the left as viewed in Fig. 11. On the other hand, a downward deflection of finger 9 from its normal position allows the lever 83 to move to the right or clockwise under the influence of its bias. As in the case of the mechanical movement of Figs. 2 to 9, the normal position of the finger 9 is analogous to that shown in Fig. 6, wherein the finger 9 is tilted upwardly from its position of parallelism with the arm 10, pivoting about a point on the periphery of the base of cone 134. A stop 134a, corresponding to stop 104 of Fig. 6, is located below finger 9 at a point adjacent to and in front of collar 133.

Fig. 12

This figure illustrates another modified form of mechanical movement which is generally similar to those of Figs. 2 to 9 and Fig. 11. In this modification, the arm 10 supports a block 135 at its front end, the block having a central recess 135a in its front face and an aperture extending through the block from front to rear. A cone 136 and a flange 136a are fixed on the finger 9 in front of the block 135. The flange 136a rests on the bottom of the recess 135a. The finger 9 extends through the aperture in the block 135, and a centering spring 137 is stressed in tension between its back end and a post 137a mounted on the arm 10. A stop strip 138 is fixed on the block 135 and limits the upward movement of the rear end of the finger 9. A retaining ring 139 is fastened to the front of the block 135, to prevent removal of the cone from its recess. The cone 136 engages the lever extension 83 directly. The operation of the modification of Fig. 12 is exactly analogous to the operation of the modification shown in Fig. 11, and will not be described in detail.

In the modifications of Figs. 2 to 9, Fig. 11 and Fig. 12, the cone may be described as a cam means for transferring motion of the finger 9 to the lever extension 83.

Figs. 13 to 15

These figures illustrate still another form of mechanical movement which may be substituted for those shown in the previous figures. In this modification, the transfer of motion from the finger 9 to the lever extension 83 is accomplished by a cam means which is structurally quite different from the cones employed in the previous modifications.

In Figs. 13 to 15, the finger 9 is mounted on the front end of a plate 140, which is pivoted on a horizontal shaft 141 carried by a yoke 142, which is in turn pivoted on a vertical shaft 143.

The plate 140 supports two diagonally upwardly extending cam fingers 144 and 145. The finger 144 is located in back of the shaft 141, and extends from the right-hand side of plate 140 diagonally upward and to the left. The cam finger 145 is attached to the plate 140 near its forward end and extends therefrom diagonally upward and to the right. A lever 146 is fixed on a pivot shaft 147a which extends parallel to the shaft 143, and engages the lever extension 83. The bias of that extension holds lever 146 against the cam fingers 145 and 144.

The plate 140 is provided with a pair of stop screws 147 and 148 which cooperate with a plate 149 fixed on a post 150 mounted on the arm 10. These stop screws determine the range of upward and downward movement of the finger 9 with respect to the arm 10. The stop screw 147 is set to prevent movement of finger 9 downwardly beyond a position where it is parallel to arm 10.

The shafts 141 and 143 and the yoke 142 form a universal joint supporting the finger 9 and transmitting angular movement thereof in any direction about the intersection of the axes of the shafts 141 and 143.

While the cam means of Figs. 13–15 which replaces the cone cam means of the previous figures is shown as having the form of fingers, it should be recognized that other equivalent cam forms may readily be used. For example, suitably contoured plates might be used in place of the fingers 144 and 145.

Operation of Figs. 13 to 15

The parts are shown in the drawing in their normal positions which correspond to the normal positions of the corresponding parts in the previous modifications. In other words, the front end of the pilot follower finger 9 is tilted upwardly slightly from a position of parallelism with the arm 10. The lever 146 is engaging the upper surface of the forward cam finger 145 and the lower surface of the rearward cam finger 144 and has been deflected by those fingers in a clockwise direction as viewed in Fig. 15 from a position of parallelism with the finger 9.

If the finger 9 is deflected further upward from this normal position, the cam fingers 145 and 144 push the lever 146 farther in a clockwise direction. If the finger 9 moves downwardly from this position, the lever extension 83 moves lever 146 by its bias in a counterclockwise direction.

If the front end of finger 9 is moved to the right from the position shown in Fig. 15, then the cam finger 144 engages lever 146 and moves it clockwise from its normal position. If the finger 9 is moved to the left from the position of Fig. 15, then the cam finger 145 engages the lever 146 and moves it clockwise.

It may therefore be seen that the operation of this mechanical movement is analogous to that of the previous mechanical movements in that a deflection of the finger 9 either upwardly to the left or right will result in a movement of lever extension 88 in the same sense from its normal position, while a deflection of the finger 9 downwardly will result in a movement of the lever extension 83 in the opposite sense from its normal position.

Fig. 16

This figure illustrates still another form of mechanical movement for converting motion of the pilot follower finger 9 into movement of a switch actuating member. The mechanical movement shown here is somewhat different from those previously disclosed in that movement of the finger upward and to the left have one control effect on the driving motor, while movement of the finger downward and to the right have the opposite control effect. Such an arrangement is not quite as desirable as the mechanical movements previously described wherein a lateral movement of the finger in either direction produced an upward movement of the main follower arm, i. e., in the direction away from the cam. With a mechanical movement of the type described in Fig. 16, it is necessary to cut the cam somewhat more carefully, in order to avoid even the slightest undercut on any downwardly directed part of the cam periphery. If any such undercut occurs, the pilot follower finger may engage the cam periphery with more than the desired minimum force, as it attempts to follow the cam surface in a downward direction.

Referring to Fig. 16, a pilot follower finger 151 is supported on a universal joint 152 of the gimbal type, which is in turn supported by a main follower arm 153, fixed on a shaft 154 which is rotated by a reversible motor 155. The back end of the finger 151 extends beyond the shaft 154 and is provided at its extremity with a roller 156, concentric with the axis of the finger 151. The roller 156 is adapted to roll along the surface of a push rod 157 which is the intermediate link in a pantograph linkage having top and bottom links 158 and 159 to support the intermediate link 157. The push rod 157 is always vertical, since the fixed pivots of the links 158 and 159 are vertically aligned. The lower end of the push rod 167 engages one arm of a bell crank lever 160, whose other arm carries a pair of magnets 161 and 162 for operating normally open magnetic switches 163 and 164, respectively.

On the front end of the main follower arm 153 is fixed a deflection plate 165. This plate extends in a generally vertical direction and has its under surface extending diagonally downward and overlies the finger 151.

The bell crank lever 160 is biased in a counter-clockwise direction by a spring 166. This spring is adapted to hold the bell crank lever 160 against the bottom of the push rod 151 thereby biasing the latter upward and to the left and holding it in engagement with the roller 156. This biases the back end of follower finger 151 to the left and thereby holds the front end of follower finger 151 against the deflection plate 165, by which it is guided downwardly until stopped by cam 7.

*Operation of Fig. 16*

If the cam follower finger 151 is pushed upward by the cam 7, then it engages the deflection plate 165 and is guided thereby to travel in a direction diagonally upward and to the left. The finger 151 pivots on the universal joint 152, the roller 156 on its back end moves to the right, pushing the push rod 157 to the right. The rod is concurrently carried downward by the parallelogram linkage and moves the lever 160 to carry the magnet 161 closer to the switch 163 to actuate the latter switch to close a circuit for energizing the motor 155 for rotation in a direction to drive the main follower arm 153 upward to follow the motion of the pilot follower finger 151. It may be seen that a movement of the pilot follower finger 151 to the left would have the same effect as an upward movement.

When the follower finger 151 moves downwardly, the spring 166 is effective to hold it against the deflection plate 165, so that it also moves to the right. Consequently, the roller 156 moves to the left, and the push rod 157 follows it, allowing the bell crank lever 160 to move counterclockwise and move the magnet 162 toward the switch 164 and actuate the latter to drive the motor 155 in a direction to produce a downward following movement of the arm 153.

The lever 160 and the parallelogram linkage including the links 157, 158 and 159 may be substituted for the lever 80 and extension 83 in any of the previous modifications.

*Figs. 17 to 20*

These figures illustrate a very simple form of mechanical movement which may be used in place of the more complex forms previously described. These figures also illustrate the use of a variable inductor to control the motor which drives the main follower arm, this inductor being used in place of the mechanically operated switches of the previous modifications. This inductor requires the use of an amplifier in order to provide a practical motor control system. It is therefore considerably more complicated than the switches described in the previous modifications. However, it is also considerably more sensitive and may therefore be used in any of the preceding modifications where the sensitivity requirements are greater than the performance attainable from a switch actuated control system.

Referring now to Figs. 17 and 18, there is shown a pilot follower finger 167 fixed on the end of a lever 168 which is pivoted on a shaft 169, journaled on suitable supports on a main follower arm 170. The finger 167 and shaft 169 are parallel to each other and to arm 170. A sensing lever 171, similar in function to the lever 80 and extension 83 of Figs. 2 to 9, is pivoted on a bearing 172, concentric with the center of rotation of the program cam 7.

The arm 170 is fixed on a shaft 173, and a downwardly depending arm 174 is also fixed on the shaft 173. A gear 175 is rotatable on shaft 173 and engages a motor-driven pinion 176. Gear 175 carries a pin 177 which co-operates with the arm 174. A spring 178 holds the arm 174 normally in engagement with the pin 177.

It may be seen that the finger 167 moves about the shaft 169 as a center, so that the finger moves upwardly and to the left concurrently, as shown in Fig. 17, and also moves downwardly and to the right concurrently. The operation of the pilot follower and cam follower of these figures is therefore more analogous to that of the follower mechanism shown in Fig. 16 than it is to the other modifications.

A stop screw 179 is threaded in the arm 170 and limits the downward movement of the lever 168.

The lower end of lever 171 is provided with a weight 180 which biases it into engagement with the finger 167. The lower end of lever 171 cooperates with the armature 181 of a variable inductor generally shown at 182 and illustrated in detail in Fig. 19. A spring 181a is stretched in tension between the inductor armature 181 and the lower end of lever 171, to elminiate any play between these parts. The inductor 182 has a primary coil 183 and a secondary coil 184 with which the armature 181 is associated. Primarily coil 183 is permanently connected to the power lines 3 and 4. The windings 183 and 184 are mounted side by side, with their axes at right angles. The coil 183 is provided with a pair of pole pieces 185 and 186 which extend laterally and enclose the sides of the winding 184. At the ends of the winding 184 pole pieces 185 and 186 are provided with extensions 185a and 186a which extend toward one another but have their tips spaced so as to leave an air gap between them. The armature 181 is pivoted at one end of coil 184, by means of a simple flat spring pivot. In its normal position, armature 181 lies midway between pole piece extensions 185a and 186a, and its opposite ends are at the same magnetic potential, so that there is substantially no magnetic flux passing through the coil 184. If the armature 181 is moved closer to one pole piece extension or the other, then a flux will pass along it to the coil 184, the direction of the flux depending upon the direction of the movement of the armature from its central position. This flux induces current in coil 184 which may be amplified by a suitable electronic amplifier 187 (see Fig. 20). The amplified current is then supplied to the winding 188 of a split phase motor 189 which may be similar to the split phase motor 11 of Fig. 1. As shown in Fig. 20, the motor 189 has another winding 190 connected in series with a condenser 191 across the power lines 3 and 4.

It should be readily understood that the variable inductor pick-up arrangement of Figs. 17 to 20 may be substituted for the switch motor control systems shown in the previous figures.

The operation of the apparatus shown in Figs. 17 to 20 is similar to the operation of the previous modifications, and it is considered that a detailed discussion of it is not necessary.

*Fig. 21*

This figure shows a cam chart 196, formed of material, e. g., light cardboard, from which a cam such as the program cam 7 of Figs. 2 and 16 may be cut by the use of a pair of scissors.

The cam chart 196 has a central aperture 196a adapted to fit over the hub 107 of Fig. 9, and is provided with a circumferential time scale 197, and a radial quantity scale 198. These scales are printed on the cam chart. Radial guide lines 199 extend outwardly from the time scale 197 and circumferential guide lines 200 extend concentrically from the quantity scale 198. The guide lines are also printed on the chart, and serve to guide the scissors of a person preparing a cam from such a chart.

I claim:

1. Cam follower apparatus, comprising a cam, a follower finger, an arm supporting said follower finger in alignment with said cam, said arm being movable to carry said finger toward and away from said cam, joint means supporting said finger on said arm and permitting movement of the finger in opposite directions from a normal position with respect to the arm, reversible motor means drivingly connected to said arm, means biasing said finger for movement toward said cam from said normal position, and control means for said motor means operatively connected to said finger and effective upon movement thereof from said normal position to drive said arm in a direction to restore said finger to its normal position.

2. Cam follower apparatus, comprising a cam of sheet material, means supporting said cam for movement in a path in the plane of said sheet material, a follower finger adapted to engage said cam, a follower supporting arm movable along a path spaced from said plane, said path having a projection in said plane transverse to the direction of movement of the cam, joint means supporting said finger on said arm with said finger projecting from said arm in a direction to intersect the path of cam movement, said joint means permitting movement of the finger in opposite directions from a normal position with respect to the arm, reversible motor means drivingly connected to said arm, means biasing said finger for movement toward said cam from said normal position, and control means for said motor means operatively connected to said finger and effective upon movement thereof from said normal position to drive said arm along its path in a direction to restore said finger to its normal position.

3. Cam follower apparatus, comprising a cam of weak, readily deformable sheet material, means supporting said cam for movement in a path in the plane of said sheet material, a follower finger adapted to engage said cam, a follower supporting arm movable along a path spaced from said plane, said path having a projection in said plane transverse to the direction of movement of the cam, joint means supporting said finger on said arm with said finger projecting from said arm in a direction to intersect the path of cam movement, said joint means permitting movement of the finger in opposite directions from a normal position with respect to the arm, reversible motor means drivingly connected to said arm, means biasing said finger for movement toward said cam from said normal position, said biasing means having a force insufficient to cause deformation of the cam material by said finger upon engagement thereof with the cam, and control means for said motor means operatively connected to said finger and effective upon movement thereof from said normal position to drive said arm along its path in a direction to restore said finger to its normal position.

4. Cam follower apparatus as defined in claim 3, in which said joint means includes a universal joint, and said control means includes means for controlling said motor means to drive said arm in a direction to move the finger away from the cam upon movement of the finger in a direction away from the cam or in either direction parallel to the path of cam movement.

5. Cam follower apparatus comprising a movable cam, a follower finger for engaging said cam, an arm supporting said follower finger and movable along a path spaced from and transverse to the path of cam movement, joint means connecting the finger to the arm with the finger projecting in a direction to intersect the path of cam movement, said joint means permitting movement of the finger from a normal position with respect to the arm in directions both transverse to and parallel to the path of cam movement, an actuating member operatively connected to said finger for concurrent movement therewith, a mechanical movement including said joint means for translating motion of the finger from said normal position in a direction having a component transverse to said path of cam movement into motion of the actuating member in a direction having a component parallel to said path of cam movement, a control member having a bearing surface aligned with said actuating member and extending parallel to the path of movement of the arm, said control member being biased to engage said actuating member and having a normal position corresponding to the normal position of said finger, means including said control member effective to bias said finger toward said cam, said actuating member being effective upon movement of the finger from its normal position to cause concurrent movement of said control member from its normal position, reversible motor means drivingly connected to said arm, and control means for said motor means operatively connected to said control member and effective upon movement thereof from its normal position to cause said motor to drive said arm in a direction to restore said finger to its normal position and thereby to return the control member to its normal position.

6. Cam follower apparatus as defined in claim 5, in which said control member is a lever pivoted for rotation about a fixed axis.

7. Cam follower apparatus as defined in claim 5, in which said cam is rotated about a fixed axis, and said control member is a lever pivoted for rotation about the axis of the cam.

8. Cam follower apparatus as defined in claim 5, in which said control member is the intermediate link of a parallelogram linkage comprising a fixed link, end links pivoted on the fixed link, and said intermediate link pivoted on the end links.

9. Cam follower apparatus as defined in claim 5, in which said joint means comprises a lever pivoted on said arm for rotation about an axis extending longitudinally of said arm, said finger being fixed on said lever and projecting in a direction generally parallel to the lever axis; and said actuating member comprises a portion of said finger spaced from the cam-engaging portion thereof.

10. Cam follower apparatus as defined in claim 5, in which said joint means comprises a universal joint.

11. Cam follower apparatus as defined in claim 5, in which said joint means comprises a universal joint and said mechanical movement comprises a guide plate fixed on said arm on the opposite side of the finger from the cam and having a guide surface extending diagonally with respect to the path of cam movement, said cam and said biasing means cooperating to maintain said finger in engagement with said guide surface, so that the finger always moves diagonally.

12. Cam follower apparatus as defined in claim 5, wherein: said joint means permits angular movement of said finger about two mutually perpendicular axes; said mechanical movement comprises first and second cam members, integral with said finger and spaced substantially diametrically on opposite sides of the intersection of said axes and having first and second cam surfaces respectively facing in opposite angular directions with respect to both said axes; and said actuating member is a lever pivoted on said arm for rotation about an axis parallel to but spaced from one of said two perpendicular axes, said lever extending in a plane parallel to the other of said two perpendicular axes and having portions aligned with said first and second cam surfaces, said lever being biased to engage said cam surfaces and being effective to bias said finger toward an angular position with respect to said one axis in which the lever engages both said cam surfaces, and effective when engaging both cam surfaces to bias said finger toward an angular position with respect to said other axis in which said lever and said finger are parallel, said finger being in its normal position when both said cam surfaces are engaged by the lever and the finger is displaced slightly from parallelism with the lever in a direction away from said cam.

13. Cam follower apparatus as defined in claim 5, wherein said joint means is a universal joint comprising a shoulder on said finger, a member fixed on said arm and having a recess loosely receiving said shoulder, and spring means yieldably holding the shoulder against the bottom of the recess, said finger being tiltable about the peripheral edge of said shoulder in a plurality of directions, said finger being in said normal position when it is tilted about said edge in a direction away from said cam and substantially less than the full extent of its range of angular movement in that direction; and said mechanical movement comprises a conical surface formed on said finger and facing in the opposite direction from said shoulder; and said actuating member is a lever pivoted on said arm for movement along a path intersecting said cone at a point spaced from its base and extending at a substantial angle to the cone surface.

14. Cam follower apparatus as defined in claim 5, in which said cam is mounted for rotation about a fixed axis, and said arm is movable along a path radial with respect to said axis.

15. Cam follower apparatus as defined in claim 5, including constant speed motor means for driving said cam.

16. Cam follower apparatus as defined in claim 5, in which said cam is formed of weak, readily deformable sheet material, and said means biasing the finger toward the cam has a force insufficient to cause deformation of the cam material.

17. Cam follower apparatus as defined in claim 5, in which said mechanical movement includes guide means to define a path of movement of said follower finger extending in a direction generally diagonal to the direction of movement of the cam and to the path of arm movement.

18. Cam follower apparatus as defined in claim 5, in which said joint means permits universal movement of said finger; and said mechanical movement includes means effective upon movement of said finger from its normal position toward the cam to cause movement of said control member away from its normal position in a direction to energize the motor means to drive the arm toward the cam, and means effective upon movement of said finger from its normal position away from the cam or in either direction at right angles thereto to cause movement of said control member away from its normal position in a direction to energize the motor means to drive the arm away from the cam.

19. Cam follower apparatus as defined in claim 5, in which said reversible motor means is electric and includes a winding effective when energized with direct current to block rotation of the motor and when energized with alternating current to cause rotation of the motor in one direction or the other, depending on the phase of the alternating current, and said motor control means comprises a pair of electric circuits, each including said winding, a pair of switches, each controlling one of said circuits, phase control means in each of said circuits and respectively effective when energized to supply to said winding currents of opposite phase, said phase control means in the two circuits cooperating when both circuits are energized to supply direct current to the winding, means biasing said switches to closed position, means for actuating said switches to open position including said control member, said biasing means being effective when the control member is in its normal position to maintain said switches closed so that the motor means and the arm remain stationary, said switch actuating means being effective when said control member moves from its normal position in one direction or the other to cause operation of the motor in a corresponding direction.

20. Cam follower apparatus as defined in claim 19, in which the phase control means in each circuit comprises a pair of similarly poled rectifiers in series with the winding at opposite electrical ends thereof, the rectifiers in the two circuits being respectively oppositely poled, all the rectifiers cooperating when both circuits are closed to form a rectifier bridge with the winding connected to its direct current terminals.

21. Apparatus for controlling a variable condition, comprising means for varying said condition, a normally balanced electrical circuit, means responsive to the condition of balance of said circuit for controlling said condition varying means, a first variable impedance, time controlled means for varying said impedance including a cam, constant speed motor means for driving said cam, a follower for said cam, a motor controlled by said follower and operatively connected to said variable impedance for varying said impedance in accordance with the follower position, a manually variable impedance, a two-position switch, circuit means cooperating with said switch and effective when said switch is in an automatic position to connect said first variable impedance in said balanced circuit so that the value of said first impedance affects the balance of said circuit, and when said switch is in a manual position to disconnect effectively said first impedance from said circuit and to connect said manually variable impedance in said circuit, and a mechanical connection between said switch and said follower for lifting the follower out of the path of the cam when the switch is moved to its manual position.

22. Control apparatus as defined in claim 21, wherein said first variable impedance is a resistance having a contact movable to engage the resistance at electrically different points and driven by said motor; said manually variable impedance is a resistance having a contact manually settable to engage the resistance at electrically different points; and said two-position switch includes contacts effective when said switch is in the manual position to connect the movable contact of said manually variable impedance in said circuit and to disconnect the movable contact of the first variable impedance therefrom, and when said switch is in the automatic position to connect the movable contact of said first variable impedance in said circuit and to disconnect the movable contact of said manually variable impedance therefrom.

23. Apparatus for controlling a variable condition as defined in claim 21, including circuit means for continuously energizing said cam driving motor means, regardless of the position of said switch.

24. Apparatus for controlling a variable condition as defined in claim 21, in which said cam rotates on a horizontal axis, and said follower engages the top of the cam, and including an arm supporting said follower, pivot means supporting said arm for movement along a vertical path, said arm being unbalanced with respect to said pivot means so that its weight biases it for downward movement along said path, joint means connecting said follower to said arm, means biasing said follower downward, means for controlling the motor in response to movement of the follower with respect to the arm, a one-way driving connection between the motor and the arm including a driving member rotatable about the axis of said pivot means and driven by said motor and a driven member fixed on said arm and cooperatively aligned with said driving member, said members being held in engagement by the weight of said arm; and in which said mechanical connection between the switch and the follower includes a lost-motion connection permitting free movement of the arm by the motor when the switch is in its automatic position, and effective to engage and lift said arm and separate said members when the switch is in its manual position.

25. Apparatus for controlling a variable condition, comprising means for varying said condition, a normally balanced electrical circuit, means responsive to the condition of balance of said circuit for controlling said condition varying means, a first variable impedance comprising a resistance having a contact movable to engage the resistance at electrically different points and means responsive to a controlling condition for moving said contact, a manually variable impedance connected permanently in parallel with said first variable impedance, a two-position switch movable between an automatic position wherein said first variable impedance is connected in said circuit through said movable contact and one of its terminals, said manually variable impedance being then effective to determine the increment of variation of the controlled condition in response to a given variation of said first variable impedance and a manual position wherein said impedances are connected in said circuit only through their common terminals, said manually variable impedance being then operable to control said variable condition.

References Cited in the file of this patent
UNITED STATES PATENTS

| | | |
|---|---|---|
| 501,902 | Spindler | July 18, 1893 |
| 2,208,420 | Gulliksen | July 16, 1940 |
| 2,308,963 | Davis | Jan. 19, 1943 |
| 2,333,248 | Harvey | Nov. 2, 1943 |
| 2,336,492 | MacKay | Dec. 14, 1943 |
| 2,369,056 | Langdon et al. | Feb. 6, 1945 |
| 2,373,186 | Isserstedt | Apr. 10, 1945 |
| 2,607,196 | May | Aug. 19, 1952 |
| 2,724,980 | Russell | Nov. 29, 1955 |